Oct. 11, 1966   H. C. OTWELL   3,277,888
ORTHOPTIC DEVICES
Filed May 24, 1965   2 Sheets-Sheet 1

INVENTOR.
HARRY C. OTWELL
BY
Head & Johnson
ATTORNEYS

Oct. 11, 1966  H. C. OTWELL  3,277,888
ORTHOPTIC DEVICES
Filed May 24, 1965 2 Sheets-Sheet 2
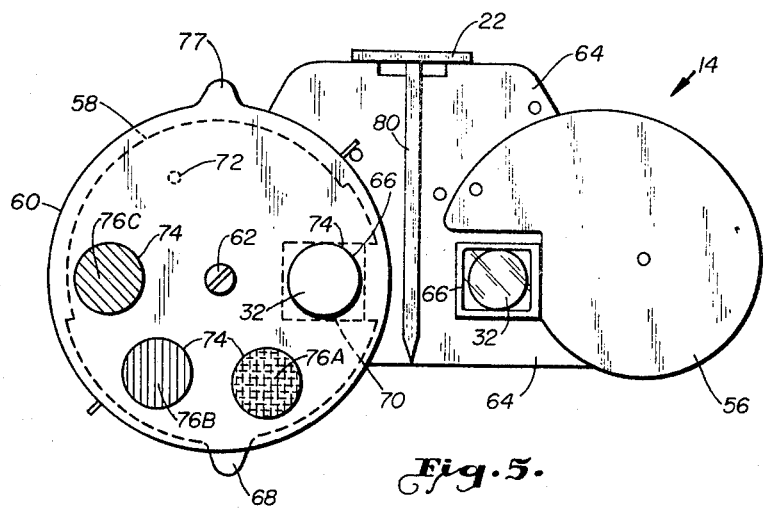
Fig. 5.
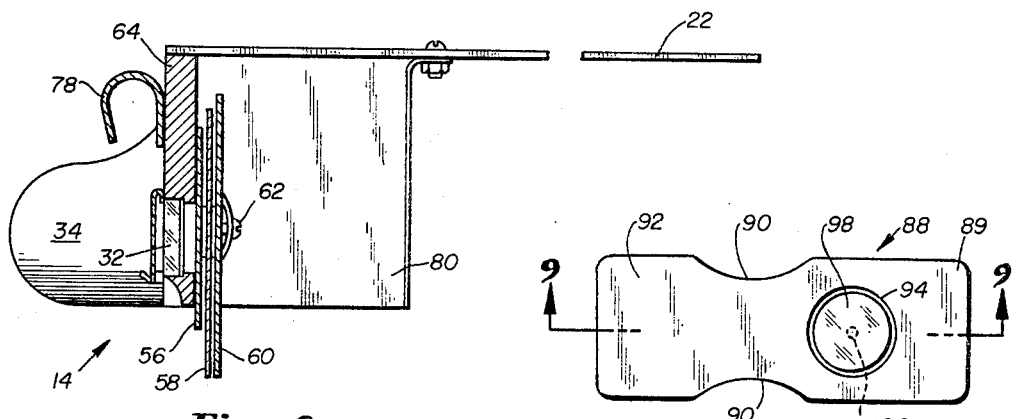
Fig. 6.
Fig. 8.
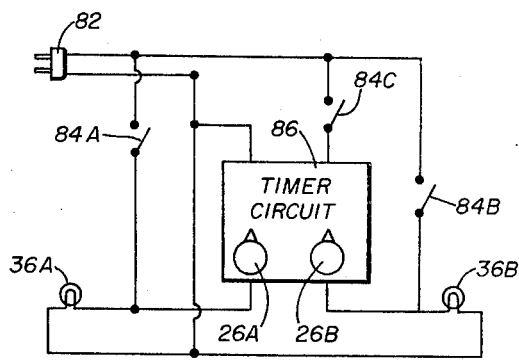
Fig. 7.
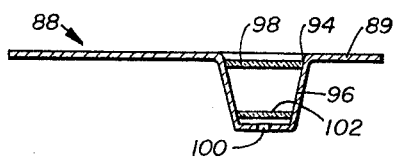
Fig. 9.
INVENTOR.
HARRY C. OTWELL
BY
Head & Johnson
ATTORNEYS

United States Patent Office 3,277,888
Patented Oct. 11, 1966

3,277,888
ORTHOPTIC DEVICES
Harry C. Otwell, Fayetteville, Ark.
Filed May 24, 1965, Ser. No. 458,355
5 Claims. (Cl. 128—76.5)

This invention relates to methods of treating certain malfunctions of the eyes and includes devices adaptable for effecting such treatments.

This is a continuation-in-part application of copending application entitled "Orthoptic Device," Serial Number 128,293, filed June 28, 1961, now abandoned.

Many people are beset by ocular difficulties which are not correctable by the prescription of lens for the eyes. Some of these types of ocular difficulties include strabismus, a condition in which binocular fixation is not present under normal conditions, sometimes also referred to as squint; suppression, which is the lack of perception of normally visible objects of one eye occurring on simultaneous stimulation of both eyes, which also may be termed ocular cortical inhibition; suspenopsia or suspension, which is an involuntary ignoring of the objects in the field of vision of one eye when visual attention is directed to objects in the field of vision of the other eye; and alternating perception, a situation in which a patient who is capable of seeing with either eye ordinarily consciously observes objects with only one or the other eye but not with both eyes. While these various visual malfunctions differ from each other in varying degree and slightly in the methods of treatment of this invention, for purposes of simplicity such types of ocular anomalies will be referred to as strabismus, is being understod that when this term is used it means any of the general malfunctions in which comfortable fused binocular vision is not present.

These ocular disorders are ordinarily traceable to some type of optics difficulty of anomaly. That is, ordinarily these problems are not correctable by merely changing the refraction of the light in front of a patient's eyes, but, on the contrary, these types of visual anomalies primarily have their roots in the subconscious mental patterns of the patient.

In order to overcome these difficulties, the optometric sciences have developed certain treatments which have been termed "visual training." In visual training the patient is required to exercise concentration on objects in an attempt to train the mind to properly coordinate and direct the eye. Frequently visual training includes kinetic stimulation of the eyes by requiring the patient to concentrate vision of one or both eyes on moving objects. In many cases visual training has been successful in improving vision but the primary disadvantage of visual training as it is known today is that it requires a great amount of effort and willpower on the part of the patient. If the patient is not willing to concentrate and force his eyes to perform the required exercises, the doctor treating him is incapable of effecting results. Even in cases where the patient is possessed of determination and willpower and fully cooperates with the doctor, the correction of vision by visual training requires a considerable amount of time, in many cases extending for more than a year. Such treatment, since constant supervision is normally required, naturally becomes exceedingly expensive. The slow results and expense discourage most suffering with impaired vision and, therefore, many drop the treatments before results can be obtained.

It is an object of this invention to provide a method of treatment which will correct ocular anomalies, such as strabismus, amblyopia, suppression, suspenopsia and alternating perception in a manner which does not require substantial concentration on the part of the patient and which accomplishes a much higher percentage of favorable results in a greatly reduced length of time.

It is another object of this invention to provide devices adaptable for use in the treatment of certain ocular anomalies according to the method of this invention.

In cases of amblyopia or faintness of vision, providing lens correction does not improve the visual performance of the patient. Amblyopia may often result in strabismus. It has been discovered that proper stimulation of the macula lutea or macular area of the retina of the eye can in most cases awaken the latent perceptiveness of the eye and combined with other treatments substantially improve the overall visual acuity of the patient which is not otherwise obtainable by the mere prescription of lenses. It is therefore an object of this invention to provide a method of treatment which is highly effective in reducing amblyopia in patients.

In addition, it is another object of this invention to provide devices adaptable for treating amblyopia.

These and other objects of this invention and a better understanding may be had by referring to the following description and claims taken in conjunction with the attached drawings in which:

FIGURE 5 is a partially disassembled view of the stereoptic head portion of the device of FIGURE 1.

FIGURE 6 is a side view of the stereoptic head portion of the device of FIGURE 1.

FIGURE 7 is a wiring diagram of the electrical portion of the device of FIGURE 1.

FIGURE 8 is a front view of a portable device adaptable for use in practicing a method of this invention by a patient in the home. This device may be termed a "portable macular stimulator."

FIGURE 9 is a cross-sectional view of the portable macular stimulator of FIGURE 8.

This invention relates to methods of treating ocular malfunctions such as amblyopia and strabismus. More particularly, but not by way of limitation, the invention relates to methods of treating ocular malfunctions, the methods being most effectively practiced utilizing a device for treating the eyes of a patient comprising a base, a first and a second isolated light source in the base, each light source of at least substantially 100 watts, a stereoptic head supported to said base and adaptable to substantially conform to and receive a portion of the face of the patient and further adapted to substantially exclude all extraneous light from the eyes of the patient, the stereoptic head portion having a first and second opening therein, the first opening permitting light from said first light source to pass through to strike one eye of the patient and said second opening permitting light from the second light source to pass therethrough to strike the other eye of the patient, means of varying the distance between the two light sources, means of varying the distance between the stereoptic head and the light sources, means of sequentially varying the level of intensity of light independently from each of the light sources, a +5.00 diopter lens in each of said openings in said stereoptic head, a first and a second aperture disc independently rotatably supported to said stereoptic head, each of said aperture discs having at least two openings therein, one of said openings in each of said aperture discs being of a larger diameter at least substantially equal in diameter to said openings in said stereoptic head whereby when said larger diameter opening in each of said aperture discs is aligned with one of said openings in said stereoptic head, substantially all the light striking said opening is permitted to pass therethrough to strike an eye of said patient, and one of said openings in each of said aperture discs being of a smaller diameter whereby when said smaller diameter opening is aligned with said opening in said stereoptic head, substantially all of the light passing therethrough strikes only the macula lutea portion of an eye of said patient, and each of said aperture discs having portions thereof with no openings therein whereby when said portions having no openings therein are aligned with an opening in said stereoptic head, substantially all of the light from said light sources is occluded from an eye of said patient, a first and second color disc independently rotatably supported to said stereoptic head, each of said color discs having two openings therein alignable with said openings in said stereoptic head, a red filter in one of said openings in each of said color discs, the red filters having a spectral range of transmission of between 610 and 650 millimicrons, and a yellow filter in the other of said openings in each of said color discs, the yellow filters having a spectral range of transmission of between 570 and 610 millimicrons.

Figure 1:
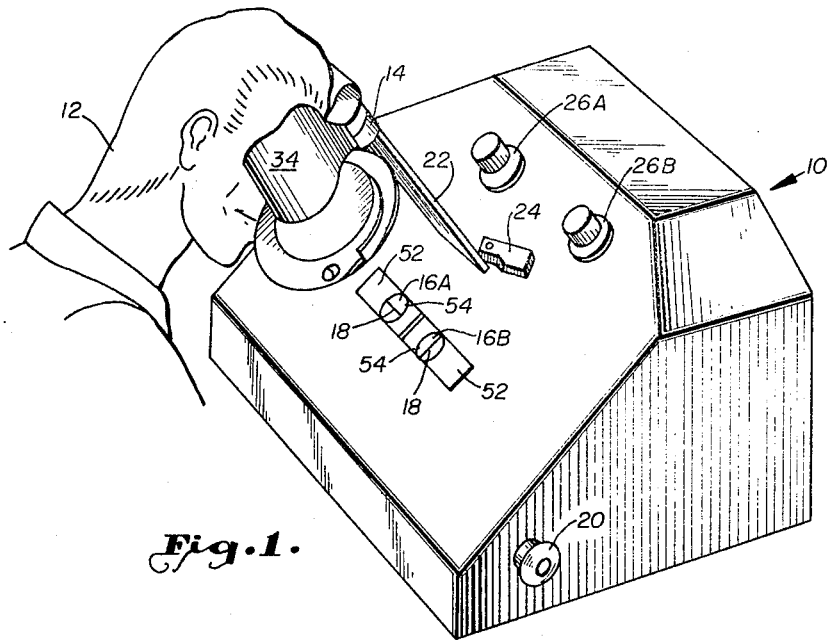
FIGURE 1 is an isometric view of a device for practicing the methods of this invention designed for use in an office showing a patient utilizing the device.

Referring now to the drawings and first to FIGURE 1, the orthoptic device designed for practicing the methods of this invention in an office is generally indicated by the numeral 10. A head of a patient 12 undergoing orthoptic treatment is shown positioned against the stereoptic head 14 of the orthoptic device 10 whereby the patient is visually receiving stimulation from two light sources 16A and 16B. Light sources 16A and 16B include cross-hairs 18 arranged such that one of the cross-hairs 18 in the one light source 16A is horizontal and the other cross-hair 18 in the other light source 16B is vertical. Whether the vertical cross-hair is in the right or left light source 16A or 16B may be varied by moving adjuster knob 20 in a manner which will be described subsequently.

Stereoptic head 14 is supported by an arm 22 which extends within the orthoptic device 10. Arm 22 may be adjusted by locks 24 so that the distance between the stereoptic head 14 and the light source 16A and 16B may be varied.

Adjusting knobs 26A and 26B provide control of components of the electrical circuit in the device 10 whereby light sources 16A and 16B may be controlled to flash on and off in varying time relationships.

Figures 2, 3:
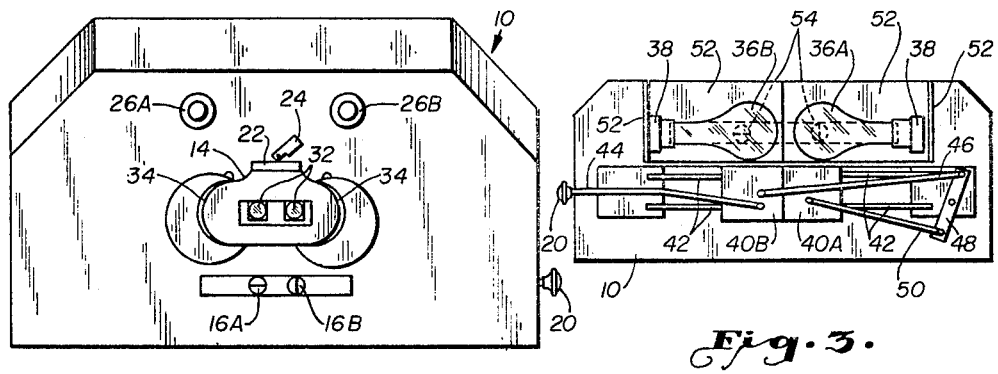
FIGURE 2 is a front view of the device of FIGURE 1.
FIGURE 3 is a partial back view of the device of FIGURE 1 showing the mounting of lights required in the device and showing means whereby the distance between the lights may be varied, the lights being shown in their nearest proximity to each other.

Referring to FIGURE 2, a front view of the device 10 (without a patient looking into it) is seen. The stereoptic head 14 includes standard +5.00 diopter stereo lenses 32. Side shades 34 are designed to closely fit around the sides of the face of the patient to eliminate any extraneous light from interfering with the treatment.

Figure 4:
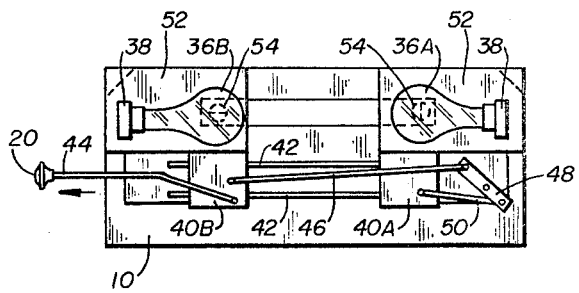
FIGURE 4 is the same view as FIGURE 3 showing the lights adjusted to the farthest removed from each other.

FIGURE 3 shows the arrangement to two light bulbs 36A and 36B which provide the illumination for light sources 16A and 16B. Bulbs 36 are screwed into bases 38 which are supported to blocks 40A and 40B. Blocks 40A and 40B slide on rails 42 which are supported to the device 10. Adjusting knob 20 is attached to an adjusting bar 44 which extends to attach to one of the blocks 40B. A connecting link 46 extends from first block 40B to a pivot bar 48 pivoted to the device 10. A link 50 connects from the opposite side of pivot bar 48 to block 40A. Bar 44, connecting link 46, pivot bar 48 and link 50 are so arranged that by the manipulation of adjusting knob 20 inwardly and outwardly away from the side of device 10 the distance between light bulbs 36A and 36B is varied. FIGURE 3 shows the device wherein adjusting knob 20 is pushed inwardly toward the side of the device 10 closing light bulbs 36A and 36B to their nearest proximity to each other. FIGURE 4 shows the arrangement of the components wherein the adjusting knob 20 is pulled outwardly so that light bulbs 36A and 36B are extended to their maximum distance away from each other.

A light shield 52 is supported to bases 38 of bulbs 36A and 36B and extends in front of the bulbs 36A and 36B. An opening 54 in each of the light shields 52 provides means whereby light emanating from bulbs 36A and 36B may pass through. The openings 54 provide the light sources 16A and 16B as seen from the front of the orthoptic device 10 as shown in FIGURES 1 and 2. Cross-hairs 18 are affixed to light shields 52 and extend across openings 54.

The construction of the stereoptic head 14 is best shown in FIGURES 5 and 6. The cross-sectional view of FIGURE 6 shows that the stereoptic head is composed of three discs designated fixed or base disc 56, aperture disc 58 and color disc 60. Base disc 56 rotatably supports aperture disc 58 and color disc 60 by screw 62. Base disc 56 is supported to the base 64 of the stereoptic head 14.

Lenses 32 are mounted in openings 66 in base 64. Aperture disc 58 may be rotated by projection 68 to provide three different openings to lenses 32. In the position shown in FIGURE 5 for the left lens 32, the aperture disc 58 is positioned so that lens 32 is completely opened by the alignment of a larger opening 70 in aperture disc 58. With aperture disc 58 rotated a few degrees, an unopened area will completely cover and thus occlude lens 32 to prevent any light from passing to the eye of the patient. By rotation of aperture disc 58 a few more degrees, a smaller aperture opening 72 can be positioned to align with lens 32 permitting only light which passes through aperture 72 to enter the eye of the patient. Aperture 72 is approximately 3/32 of an inch in diameter and is designed to permit light to be concentrated on the macular area of the retina of the patient's eye for certain treatment purposes to be described subsequently.

Color disc 60 is provided with four openings 74. One of the openings is blank so that when aligned with lens 32 there is no filtration permitting the patient to see test cards (not shown) which may be positioned on the instrument. Light bulbs 36 are never illuminated when a blank opening is aligned with the lens. The other three openings 74 are provided with colored filter discs 76A, 76B and 76C. One of the filter discs 76A is of a yellow or sodium light color. Filter 76B is a red colored disc and filter 76C is a green colored disc. The various colored filters 76A, 76B and 76C are utilized in treatment of various visual defects in manners to be described subsequently. Color disc 60 may be rotated by projection 77.

Filter 76A is of the selective type which absorbs much of the spectrum and transmits a narrow spectral region. The transmitted spectral region of filter 76A is between 570 and 610 millimicrons. Best results are obtained when using a 586 millimicron filter. The range for the red filter 76B should be between 610 and 650 millimicrons, with best results achieved with a 636 millimicron filter. The green filter 76C is useful for certain tests but is not used in the methods of treatment of this invention.

By the manipulation of aperture discs 58 and color discs 60, various arrangements of lights can be directed into each eye of the patient independently to produce the required effect to achieve treatment according to the principles of this invention. A head rest 78 is affixed to base 64 against which the patient rests his forehead to provide comfort, support and proper relationship of the eyes with lenses 32. Light shield 80 extends between lenses 32, supported by arm 22, to prevent the intermingling of light which is emitted from light sources 16A and 16B between lenses 32A and 32B.

A rudimentary wiring diagram is shown in FIGURE 7. Light bulbs 36A and 36B are controlled by an electrical circuit in a manner to provide therapeutic effect. A plug 82 extends from the orthoptic device to engage a source of power. Switch 84A may be utilized to continuously energize light bulb 36A and switch 84B may be utilized to continuously energize light bulb 36B. Switch 84C energizes an electrical switching circuit so as to automatically and sequentially turn light bulbs 36A and 36B on and off. Light bulbs 36A and 36B must be of a brilliance when illuminated at least to the equivalence of a 100 watt bulb, and preferably bulbs of from 100 to 150 watts are necessary to obtain maximum results. Sequential adjusting knobs 26A and 26B adjust the frequency of the on and off cycles of light bulbs 36A and 36B. Sequential adjusting knobs 26A and 26B can be utilized in cooperation with each other to adjust the length of time the lights are on and the length of time the lights are off. The circuit is arranged so that the lights can be alternately applied to first the left and then the right eye by first energizing bulb 36A, deenergizing it and then sequentially energizing bulb 36B. This reciprocal energization produces a therapeutic effect which will be described in more detail subsequently. The electric timer circuit indicated generally by the numeral 86 may be a standard designed flip-flop multivibrator electrical circuit using vacuum tubes or transistors or may be any type of electronic, electrical or mechanical switching means to produce sequential energization of light bulbs 36A and 36B.

Orthoptic treatment is best carried out under the supervision of a skilled orthoptist. Certain types of treatment, however, and especially that for amblyopic, can be practiced after adequate instruction by a patient during his leisure hours at home. For this type of treatment, a portable orthoptic device indicated generally by the numeral 88 is shown in FIGURES 8 and 9. The device consists of a flat sheet of some material, such as plastic or some fibrous material, forming a base 89. The portable orthoptic device 88 is designed to be adaptable for use by an individual and includes recesses 90 to accompany the nose of the patient when he holds the device 88 to his eyes. One-half of the portable orthoptic device 88 is solid or unopened and serves as an occluder, this half being generally indicated by the numeral 92. This prevents the entrance of substantial light in one eye when the device 88 is held to the eyes. The other half of the portable orthoptic device 88 is supplied with an opening 94 having a cylinder or truncated cone portion 96 integrally formed therewith and extending a distance away from the flat body portion 89 of the device. A +5.00 diopter lens 98 covers opening 94. The cone portion 96 is sealed at the end at a distance away from lens 98 and is provided with a small aperture 100. A yellow filter 102 is supported between the aperture 100 and the lens 98. The yellow filter 102 is the same as the yellow filter 76A as used in the instrument of FIGURE 1, that is, it has a spectral region of transmission within the sodium band between 570 and 610 millimicrons.

*Application*

In order to appreciate the novelties and uniqueness of this invention, it is necessary to first understand the distinction between the method of utilizing the method of this invention to effect orthoptic treatment as distinguished from what is commonly called "visual training." The object of visual training is to train muscular reactions of the eyes in much the same manner that an athlete trains his muscles for performance in athletic contests. Visual training requires repetitious flexing of the eye muscles by the conscious will of the patient through a process calculated to strengthen certain muscles and teach habits of ocular muscular control.

Most strabismus cases, especially suspension cases, require the establishment of freedom of movement of binocular rotations before effective treatment by the methods of this invention. This freedom of movement as a foundation condition for treatment is best established by rotation exercises. A small colored ball or other object, preferably placed on the end of a pencil or stick, is used as a target. The pencil or stick is held uprightly in the hand of the person administering the treatment. The ball is brought within one inch of the patient's nose, is raised straight up as far as possible within the visual range of the patient without the patient moving his head, usually about twelve inches, and then a wide circle is scribed in this plane. The patient with his head held still watches the target during the rotational movements. Treatment time is not more than two minutes long. After a rest period of ten minutes, treatment may be resumed. This circle treatment exercises the eye muscles and provides relaxed eye excursions. Such exercises are not a part of the methods of this invention, however, but only assist in establishing eye muscular freedom to prepare the patient to more rapidly respond to treatment.

According to the principles of this invention, and the method of treatment incorporated therein, the conscious effort on the part of the patient is not required except to the extent that he is required only to keep his eyes open to permit light to enter the eye. No conscious muscular activity is demanded.

The treatment of this invention is based on the fact that many types of ocular anomalies such as strabismus (including suppression, suspenopsia and ocular alternation) have their origin in a deep seated mental block which is beyond the conscious direction of the victim and which is not subject to correction by mere external optical adjustments such as is provided by eye glasses. According to the theory on which this invention is based, such visual anomalies can be treated only by breaking down the subconscious mental conditions which result in the visual difficulties. This can be accomplished by reopening mental paths which have been blocked.

The cause of blocking of the mental paths is, for the most part, unknown but may be explained by way of example by the occurrence of an amblyopia in one eye of the patient at some earlier age. The mind, rather than attempting to coordinate a strong and a weak visual signal pattern and fuse them, as occurs in normal vision, as a defensive effort, blocks off the weaker pattern. The source of the amblyopia may subsequently be removed so that the eye which is not being used can be restored to full detective power but the mind nevertheless has blocked vision from this eye and will not attempt to coordinate vision from this rejected eye with that of the dominant eye. The result is that the patient is unable to achieve a fused triangulated vision with a resultant impairment of seeing ability. The unused eye loses its muscular toneness so that mental energy is not utilized effectively to direct the mechanical position of the eye such as to cause a triangulation. In the absence of adequate fusion stimulus, the condition known as a phoria exists. Since the vision of one eye has been rejected by the mind, and the mental energy directed to the physical positioning of the eye is reduced, there may develop a tendency for the eye to become completely oblivious to the object under observation by the patient and therefore to fail to respond to concentration of vision on an object. This causes the eyes to fail to converge which not only destroys the visual acuteness of the patient but may also destroy his physical appearance. Such conditions cause what is commonly referred to as "cross-eyed."

*Treating of strabismus*

According to the principles of this invention, the method of correction is to break down the mental block of the rejected eye and re-establish a firm pattern of communication between the eye and the mind and finally to establish a fused pattern of vision to produce a triangulated optical pattern wherein the patient achieves normal, full, three-dimensional, depth perception vision. Utilizing the device of this invention, the patient is subjected to alternating lights so that first one eye is shocked by light when light source 16A is brightly illuminated. This light is extinguished and immediately light source 16B is illuminated shocking the other eye. This alternate shocking of the eyes by the penetration of a rather brilliant light sets up an artificial pattern of visual stimulation of the mind. This artificial pattern, when first one eye and then the other is shocked into activity, tends to "confuse" the mind, that is, it interferes with the normal habit of thought of the visual center of the mind so that the old habits which have been subconsciously formed are broken down. After a series of treatments, which will depend for their duration of the length of time the patient has been subjected to unnatural vision, the degree of impairment of vision and other factors, normal visual patterns are restored so that each eye is utilized in its proper relationship and neither eye is favored nor rejected by the visual centers of the mind. In the ordinary treatment this alternate stimulation of the eyes breaks down the cortical suppression and establishes a binocular pattern of visualization. Bulbs 36 must each be alternately energized and deenergized faster than the patient can change fixation from one eye to the other. This causes cortical confusion and breaks the suppression pattern.

The speed of alternation of lights 36A and 36B must be at least 140 flashes per minute, that is, each of the lights must flash at least 70 times per minute. The maximum rate of flashing must be slow enough so that the filament of each light 36A and 36B extinguishes illumination, otherwise the patient will localize with the dominate eye and suppress with the non-dominant eye. Generally, the maximum rate of flashing must be below 170 flashes per minute. A rate of 148 flashes per minute is most effective.

When treatment is given for strabismus, both eyes are subjected to alternating flashing lights. Aperture disc 58 for each eye is rotated to align openings 70 to fully exposed lens 32. Color disc 60 is rotated for each eye to align red filters 76B. Thus, in the treatment of strabismus, each eye is alternately fully subjected to high intensity red filtered light of a frequency faster than the patient can change fixation from one eye to the other.

Treating amblyopia

Amblyopia exists because of the lack of sensitization in the macular area. Such lack of sensitization may arise for a variety of reasons but primarily it is apparently due to non-use due to such factors as refractive error to such an extent that an image cannot be placed on the macula in its proper form. This results in a blurred or distorted image. If amblyopia occurs in one eye, this anisometropia cannot be tolerated in a binocular pattern. A defense system is set up by nature to suspend perception of this eye. Thus the suspended perception results in further disuse of one eye, with results in a more blurred or distorted image. The cycle is regenerative.

It has been discovered that amblyopia can be successfully treated in most cases by effective stimulation of the macula, that is, by improved sensitization of the macula lutea. Treatment of amblyopia may be effected either with the device illustrated in FIGURES 1 through 7 of the drawings, the device being designed for use in an office under supervised direction of a skilled practitioner, or by the device illustrated in FIGURES 8 and 9 used in conjunction with a separate flashing light, not shown. In either case the method of treatment is the same and consists basically of subjecting the macula portion of the amblyopic eye to a bright amber light flashing sequentially at a rate of approximately four and one-half seconds on and one and one-half seconds off.

When using the device of FIGURES 1 through 7, the aperture disc 58 for the eye to be treated is rotated to align the small aperture 72 with lens 32. The aperture disc 58 for the other eye is rotated to provide occulsion. The color disc 60 of the eye being treated is rotated to align the amber or sodium colored disc 76A with lens 74. The timer circuit 86 is set to flash the light 36A or 36B (whichever is being used) on and off. As previously stated, the light must be on approximately four and one-half seconds and off one and one-half seconds. The other light is not illuminated, the other eye being occluded, since only one eye is treated for amblyopia at a time.

The portable orthoptic device 88 is utilized by the patient who places the device to his eyes so that the eye which is not being treated is covered by the occluder portion 92 and the other eye receives light only through aperture 100, which light passes through filter 102 and lens 98. A bight flashing light of at least one hundred watts is then placed approximately eight inches from device 88. The patient utilizes the portable orthoptic device 88 by looking into the bright light which is sequentially energized and deenergized. The aperture 100 concentrates the light to strike the macula lutea area of the retina of the eye.

Lens 98 is preferably of a +5.00 diopter magnification. When such lens is used the light source (not shown) should be placed at a distance of eight inches from aperture 100 If some other dioptic value is used for lens 98, then adjustment of the distance from the lens to the light source will be necessary. The light source must be at least 100 watts and preferably between 100 and 150 watts. The light must be energized intermittently in cycles of approximately four and one-half seconds on and one and one-half seconds off. The recommended treatment period is twelve minutes at each session, but this length of treatment period may be altered according to the particular case. The device of FIGURES 8 and 9 is utilized to practice the same method of treatment of amblyopia as is practiced using the machine of FIGURES 1 through 7.

Laboratory tests have indicated that by utilizing the principles of this invention wherein the treatment breaks down subconscious mental patterns and mental blocks rather than attempting by the processes of visual training to merely strengthen conscious muscular activities, treatments of certain anomalies such as strabismus, including suppression and alternation, can be accomplished in only a fraction of the time formerly required and can, in many cases, produce results which heretofore were completely unobtainable. In cases wherein amblyopia is present, such must normally be overcome before tonotic treatment can be effective.

The exact schedule of treatment utilizing the principles and devices of this invention will vary according to the type of ocular anomaly being treated and according to the preferences of the practitioner. In treating cases of strabismus and other phoria type difficulties, the manipulation of adjuster knob 20 can be used to indicate when the patient has achieved a fused vision wherein hair lines 18 cross with the adjuster knob 20 in the proper position indicating that a fused binocular triangulated vision pattern has been accomplished by the treatment process.

The nerves of sight, as is well known, consist of rods and cones. The fovea has only cones and is the portion of the eye providing detailed sight. The macula which includes the fovea and the area surrounding it has a population of cones and rods, with the percentage of cones diminishing with increasing distance from the fovea. In treating amblyopia, as previously described, the amber light is concentrated on the macula and localized primarily on the fovea. While the cause of visual acuteness increase obtained by the methods of this invention is not certain, it is presumed that the sodium light sensitizes the cones. The sodium light is evidently an irritant which rejuvenates the sensitivity of the cones. A patient may have macular vision absent fovea vision which, if there is no pathological reason, is amblyopia. If this visual difficulty exists for pathological reasons, it is not amblyopia and the methods of this invention are not intended to attempt treatment.

The term "eye" as used herein includes not only the spheroid body organ of vision but the whole visual system of the nerves, mind, and so forth, by which conscious vision is attained. Treating the eyes by the method of this invention includes treatment of the whole nervous system which accomplishes vision.

Although this invention has been described with a certain degree of particularity, it is manifest that many changes may be made in the details of construction and the arrangement of components and the sequential steps of the treatment according to the principles of the invention, all without departing from the spirit and scope of this disclosure.

What is claimed:

1. A method of treating an eye of a patient for amblyopia comprising the steps of
   (a) positioning a light source of at least 100 watts approximately 8 inches from the amblyopic eye;
   (b) interposing an occluder having a small diameter aperture therein between the eye and the light source whereby the light entering the eye is concentrated on the macular area;
   (c) interposing a yellow filter between the light source and the eye, the filter having a spectral range of transmission between 570 millimicrons and 610 millimicrons;
   (d) energizing the light source for approximately four and one-half seconds;
   (e) deenergizing the light source for approximately one and one-half seconds; and
   (f) sequentially repeating steps (d) and (e).

2. A method of treating an eye for amblyopia according to claim 1 including interposing a +5.00 diopter lens adjacent the eye and between the eye and the light source.

3. A method of treating an eye for amblyopia according to claim 1 wherein the light source is sequentially energized and deenergized for a period of approximately 12 minutes, such duration constituting a treatment period, and wherein each treatment period is followed by a rest period.

4. A method of treating a patient for strabismus, including suppression, suspension and alternation, comprising the steps of positioning a light source of at least approximately 100 watts intensity approximately 8 inches from each eye of the patient;

interposing a +5.00 diopter lens adjacent each eye and between the eyes and the light sources;

interposing a red filter between the light source and each eye, the filters having a spectral range of transmission of between 610 and 650 millimicrons; and sequentially alternately energizing and deenergizing each light source, each light source being deenergized when the other light source is energized, the sequence occurring at a rate of at least 70 times per minute and not more than 85 times per minute for each light source.

5. A device for treating the eyes of a patient comprising:
   a base;
   a first and a second isolated light source in the base, each light source of at least substantially 100 watts;
   a stereoptic head supported to said base and adaptable to substantially conform to and receive a portion of the face of the patient and further adapted to substantially exclude all extraneous light from the eyes of the patient, the stereoptic head having a first and a second opening therein, the first opening permitting light from the first light source to pass through to strike one eye of the patient and the second opening permitting light from the second light source to pass therethrough to strike the other eye of the patient;
   means of varying the distance between the two light sources;
   means of varying the distance between the stereoptic head and the light sources;
   means of sequentially varying the level of intensity of light independently from each of the light sources;
   a +5.00 diopter lens in each of said openings in said stereoptic head;
   a first and a second aperture disc independently rotatably supported to said stereoptic head, each of said aperture discs having at least two openings therein, one of said openings in each of said aperture discs being of a larger diameter at least substantially equal in diameter to said openings in said stereoptic head whereby when said larger diameter opening in each of said aperture discs is aligned with one of said openings in said stereoptic head substantially all the light striking said opening is permitted to pass therethrough to strike an eye of said patient, and one of said openings in each of said aperture discs being of a smaller diameter whereby when said smaller diameter opening is aligned with said opening in said stereoptic head substantially all of the light passing therethrough strikes only the macula lutea portion of an eye of said patient, and each of said aperture discs having portions thereof with no openings therein whereby when said portions having no openings therein are aligned with an opening in said stereoptic head substantially all of the light from said light source is occluded from an eye of said patient;
   a first and a second color disc independently rotatably supported to said stereoptic head, each of said color discs having two openings therein alignable with said openings in said stereoptic head;
   a red filter in one of said openings in each of said color discs, the red filters having a spectral range of transmission of between 610 and 650 millimicrons; and
   a yellow filter in the other of said openings in each of said color discs, the yellow filter having a spectral range of transmission of between 570 and 610 millimicrons.

References Cited by the Examiner

UNITED STATES PATENTS

| 2,316,139 | 4/1943 | Wottring | 128—76.5 |
| 2,803,246 | 8/1957 | Lange | 128—76.5 |
| 3,082,763 | 5/1960 | McLaughlin | 128—76.5 |

FOREIGN PATENTS 779,811  12/1935  France.

RICHARD A. GAUDET, *Primary Examiner.*

SIMON BRODER, *Examiner.*